United States Patent
Ahner et al.

(12)

(10) Patent No.: US 6,250,270 B1
(45) Date of Patent: Jun. 26, 2001

(54) STARTING AND DRIVING UNIT FOR AN INTERNAL COMBUSTION ENGINE OF A MOTOR VEHICLE

(75) Inventors: Peter Ahner, Boeblingen; Manfred Ackermann, Oppenweiler, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/446,372

(22) PCT Filed: Apr. 19, 1999

(86) PCT No.: PCT/DE99/01161

§ 371 Date: Apr. 28, 2000

§ 102(e) Date: Apr. 28, 2000

(87) PCT Pub. No.: WO99/54620

PCT Pub. Date: Oct. 28, 1999

(30) Foreign Application Priority Data

Apr. 20, 1998 (DE) ............................................... 198 17 452
Dec. 21, 1998 (DE) ............................................... 198 58 992

(51) Int. Cl.⁷ ............................. F02N 11/04; F02N 11/08
(52) U.S. Cl. ................. 123/179.3; 123/179.22; 290/31; 290/38 B
(58) Field of Search ............................ 123/179.3, 179.4, 123/179.22; 290/31, 38 B

(56) References Cited

U.S. PATENT DOCUMENTS 4,626,696 * 12/1986 Maucher et al. ................ 123/179.22
6,032,632 * 3/2000 Bolenz et al. ..................... 123/179.3
6,098,584 * 8/2000 Ahner et al. ....................... 123/179.3

* cited by examiner

Primary Examiner—Andrew M. Dolinar
(74) Attorney, Agent, or Firm—Michael J. Striker

(57) ABSTRACT

The invention relates to a starting/driving unit for an internal combustion engine (VM) of a motor vehicle with at least two starting methods, which has a clutch (K) between the crankshaft (KW), the engine (VM), and the vehicle transmission (FG) as well as an electric machine which is connected to the engine (VM) by way of the clutch (K). With the electric machine, the two starting methods can be executed in an optimal fashion solely by virtue of the fact that through rotation of the crankshaft by means of the electric machine, each starting method is preceded by a start clearing phase in which the starting conditions are detected when the clutch is engaged, a decision is made as to the subsequent operating phases (direct start phase, positioning phase, preinjection phase, impulse start phase) and their starting parameters are determined.

8 Claims, 1 Drawing Sheet

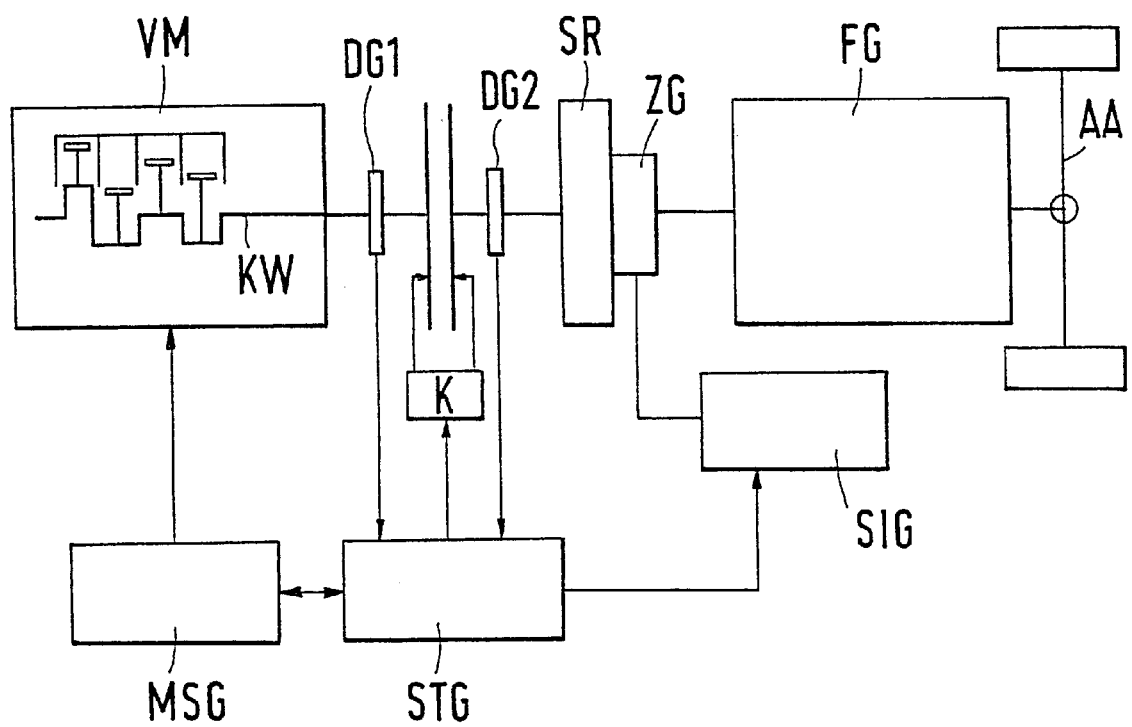

STARTING AND DRIVING UNIT FOR AN INTERNAL COMBUSTION ENGINE OF A MOTOR VEHICLE

BACKGROUND OF THE INVENTION

The invention relates to a starting/driving unit for an internal combustion engine of a motor vehicle, having at least two starting methods, having a clutch between the crankshaft, the engine, and the vehicle transmission, and also having an electric machine which is connected directly to the engine and/or the clutch is connected to the engine.

A starting/driving unit of this kind for two starting methods has been disclosed by DE 197 05 610 A1. In this connection, the starting method is chosen as a function of the temperature of the engine. The starting methods require two starting systems. The electric machine that serves as a motor and generator is used to start the warm engine while a conventional starter, together with electric machine, is used for starting when the engine is cold. The two starting systems require a high expenditure in order to also be able to function in stop-and-start operation and in inertial system operation.

Conventional starters have disadvantages for a number of reasons. In terms of the service life of the starter motor, in terms of the service life of the pinion and the toothed ring as well as the override clutch, and in terms of noise generation, starters of this kind do not attain the goal if the number of starting cycles is increased due to repeated starts when the engine is warm, e.g. in stop-and-start operation at traffic signals, in traffic jams, or after a thrust phase, in which a faster and quieter start is required. Even if the starter is provided with improved electronics, which results in an increased starting cycle count, this is not sufficient to achieve required starting cycle counts of >200,000. The starting system that is improved in this manner cannot achieve the desired starting time and quietness.

In addition, WO 98/05882 has already disclosed providing a starting generator for direct starting. This embodiment cannot be realized with a conventional 12 V to 24 V lead starter battery because of the starting energy and the starting output during a cold start. Furthermore, the electric motor would have to be enlarged by more than a factor of 3 in relation to the demand for the generator output, which among other things, can also lead to difficulties with the structural size. However, extremely high starting moments and battery outputs are not required in order to start the warm engine.

The use of a starting generator for an impulse start according to DE 197 45 995 A1, in which a starting generator is connected to the crankshaft by way of a start coupling between the crankshaft and a flywheel in addition to or in lieu of the usual coupling between the flywheel and the vehicle transmission, functions so that when the engine (and transmission) are uncoupled, the electric motor first accelerates the flywheel mass to the drive speed (e.g. 1000 rpm) and then with a rapidly following start coupling or clutching, drives the engine via the rotation energy. This impulse start is suitable for normal cold starts, but due to time constraints, is unfavorable for re-starting when the engine is warm both at traffic signals and after the end of thrust phases.

SUMMARY OF THE INVENTION

The object of the invention is to produce a starting/driving unit of the type mentioned at the beginning, which is suitable for high starting cycle counts by itself with an electric machine and without a conventional starter, functions quietly, and remains within energy demand limits.

This object is attained according to the invention by virtue of the fact that each starting method is preceded by a start clearing phase in which when the clutch between the crankshaft, the engine, and the vehicle transmission is engaged, and has an electric machine which is connected to the engine by way of the clutch.

During the start clearing phase, when the clutch is engaged, the current starting conditions are detected, the subsequent operating phases are selected based on the current starting conditions, and the starting parameters for them are selected. Preferably a starting generator is used as the electric machine.

A simple detection of the current starting conditions is achieved by virtue of the fact that in the start clearing phase, the starting control unit uses a speed sensor to detect the speed progression of the crankshaft and utilizes this speed progression to derive the starting method and the starting parameters. The drag moment that is present during starting has an effect on the speed progression. When the drag moment is high, the engine is cold, when it is low, the engine is already warm. Alternatively, the starting method can be determined by way of a temperature measurement or a plausibility control can be executed with it. As a rule, the speed progression has already been detected by means of a crankshaft speed sensor so that this can also be used for the derivation of the existing starting conditions. The correct starting method is identified through preset limit values of the measured drag moment.

According to one embodiment, considerable differences arise in the speed progression by virtue of the fact that the decision as to the starting method can be derived from the region of the speed progression between the first and/or second maximum and/or the first and/or second minimum of the speed. As a result, definite conclusions can be drawn about the existing drag moment and can be used to select the correct starting method.

With a high drag moment, the impulse start is selected as the operating phase. With an even higher drag moment, which is too high for the normal impulse start, before the impulse starting phase, a so-called dry impulse starting phase, i.e. without ignition and injection, is initiated in which the synchronization and a possible preinjection of fuel are executed by means of an electronic motor control unit (Motronic). This is an advance impulse start in which when the clutch is disengaged, the starting generator first accelerates the flywheel to the necessary speed in order to then produce a position detection/synchronization when the clutch is engaged.

The electric machine can be designed with or without a reduction gear and can be directly connected to the transmission shaft and can be connected to the engine by means of a rapidly engaging clutch.

BRIEF DESCRIPTION OF THE DRAWING

The invention will be described in detail in conjunction with an exemplary embodiment that is shown as a schematic wiring diagram in the sole FIGURE.

DESCRIPTION OF THE PREFERRED EMBODIMENTS

As shown in the sole FIGURE, the vehicle transmission FG is connected to the engine VM by means of an intermediary transmission ZG and by means of a clutch K that is used as a start coupling. An electric machine that is used as a starting generator S/G is connected directly to the transmission shaft and is also connected to the engine VM by way of a flywheel SR and the clutch K. By means of speed sensors DG1 and DG2 that are already provided for other functions, the speed progression on the input side and the output side of the clutch K is detected in an electric starting control unit STG and this is used in a start clearing phase to make a decision as to the starting method to be used and the starting parameters for it.

In comparison to previously proposed embodiments, a cold start occurs with a comparatively low torque of the electric machine by means of a start clearing phase preceding the impulse start, in which in a first starting method when the clutch K is engaged and in a second starting method by means of a dry impulse start, the crankshaft KW is positioned and a/the crankshaft/camshaft position is fully detected so that if need be, a preinjection can be can be stopped in the cylinders to be ignited next. A subsequent impulse start then occurs in an absolutely reliable and very rapid manner even in a spark-ignition engine. Preinjection and ignition are executed in a known manner by means of a motor control unit MSG, which corresponds to the starting control unit STG (synchronization).

The starting/driving unit according to the invention consequently offers an optimal combination of a "synchronized" impulse start in the extreme cold starting range and direct starting up to a relatively low temperature limit value, wherein the temperatures are reflected in the speed progression. The second starting method results in the production of a precisely modulated impulse start so that when an engine VM is at operating temperature, a minimal wind-up time and therefore high starting dynamics are achieved.

The starting generator S/G torques required at the cold start limit temperature for the (impulse) start of the first starting method can be up to a factor of 2 lower than in the corresponding direct start, even up to a factor of 4 with the second starting method.

The decisive improvement is achieved by means of a virtually interruptionless, speed-controlled starting process. No additional sensor is required for deciding which starting method and which starting parameters to select since the already existing crankshaft speed sensor DG1 can be used for this purpose.

A run-out detection and a positioning when the engine is oscillating to a stop is not necessary. This also obviates the need for measures to safeguard the crankshaft position when the engine is shut off.

Both starting methods turn out to be particularly advantageous depending on the desired centers of gravity of the vehicle concept:

Starting Method 1
(the Objective is Low Battery Output)

| | |
|---|---|
| phase 1 (start coupling K engaged) | cranking of the crankshaft KW by means of the starting generator S/G with a predetermined voltage or output and with detection of the starting conditions by means of drag moment measurement with a sensor DG1, with selection of the starting method through comparison with a preset limit value, determination of the starting parameters, e.g. starting speed or starting time (start clearing phase). |
| Phase 2A (start coupling K engaged) | Direct start with a low drag moment of the machine in phase 1 (warm start). |
| Phase 2B (start coupling K engaged) | Positioning, angle detection, possible preinjection with a high drag moment in phase 1. |
| Phase 3B (start coupling K disengaged) | Wind-up of the flywheel SR with the starting generator |
| Phase 4B (start coupling K engaged) | "synchronized", rapid impulse start (cold start). |

Phases 1 and 2A or 1 and 2B are overlapping parts of the direct start or occur before the subsequent impulse start.

Starting Method 2
(the Objective is Low Currents in the Starting Generator)

| | |
|---|---|
| phase 1 (start coupling K engaged) | Cranking of the crankshaft KS by means of the starting generator S/G. Detection of the starting conditions and selection of the starting method, determination of the starting parameters (start clearing phase). |
| Phase 2A (start coupling K engaged) | Direct start (like 2A in starting method 1) = warm start. |
| Phase 2B (start coupling K engaged) | Impulse start (like 2B to 4B in starting method 1) = cold start. |
| Phase 2C (start coupling K disengaged) | Flywheel SR accelerated to a low speed by the start generator S/G. |
| Phase 3C (start coupling K engaged) | Dry impulse start with positioning, angle detection, possible preinjection. |
| Phase 4C (start coupling K disengaged) | Wind-up of the flywheel SR with the demand-controlled wind-up time/wind-up speed. |
| Phase 5C (start coupling K engaged) | "synchronized", rapid impulse start = extreme cold start. |

The starting process occurs in a speed-controlled, constant manner with the following functions.

Measurement of the moment in the flywheel SR alone or in the flywheel SR with the engine VM by means of speed.

Crankshaft/camshaft rotation angle detection

Detection of the starting conditions and determination of the starting parameters demand-controlled, automatic switch-over from direct start to impulse start with demand-controlled wind-up or acceleration of the flywheel.

In a dry impulse start, it is alternatively also possible to wind up the flywheel SR by means of the starting generator S/G until after a momentary engagement of the clutch, the synchronization and preinjection are executed and the impulse start is then executed with the residual energy of the flywheel SR.

What is claimed is:

1. A starting/driving unit for an internal combustion engine of a motor vehicle with at least two starting methods, which has a clutch between a crankshaft, the engine, and a vehicle transmission as well as an electric machine which is connected to the engine by way of the clutch, wherein each starting method is preceded by a start clearing phase in which when the clutch (K) is engaged, the crankshaft (KW) of the engine (VM) is rotated by the electric machine and in so doing, the starting conditions are detected in a starting control unit (STG) by means of a speed, a decision is made as to the subsequent operating phases (direct start phase, positioning phase, preinjection phase, impulse start phase) and their starting parameters are determined.

2. The starting/driving unit according to claim 1, wherein a starting generator (S/G) is used as the electric machine.

3. The starting/driving unit according to claim 1, wherein in the start clearing phase, the starting control device (STG) detects the speed progression of the crankshaft (KW) by means of a speed sensor (DG1) and derives the starting method and the starting parameters from this speed progression.

4. The starting/driving unit according to claim 3, wherein the speed progression can be measured in the existing crankshaft speed sensor (DG1).

5. The starting/driving unit according to claim 3, wherein the decision as to the starting method can be derived from the region of the speed progression between speeds selected from the group consisting of a first maximum of this speed, a second maximum of this speed, a first minimum of the speed, and a second minimum of this speed.

6. The starting/driving unit according to one of claim 3, wherein the impulse start phase can be selected when there is a high drag moment, wherein after the start clearing phase, the electric machine winds up a flywheel (SR) when the clutch (K) is disengaged, before the clutch (K) engages.

7. The starting/driving unit according to claim 6, wherein with a drag moment that is insufficient for the impulse start phase, before the impulse start phase, a dry impulse start phase (without ignition and injection) is executed, in which a synchronization and if need be, a preinjection, can be executed by means of a motor control unit (MSG).

8. The starting/driving unit according to claim 3, wherein with a low drag moment, an interruptionless transition into the direct start phase is executed.

\* \* \* \* \*